(12) United States Patent
Pike et al.

(10) Patent No.: US 8,046,201 B1
(45) Date of Patent: Oct. 25, 2011

(54) COMMUNICATION SYSTEM FOR USE WITH A BLOCK DIAGRAM ENVIRONMENT

(76) Inventors: Melissa J. Pike, Milford, MA (US); Loren Dean, Natick, MA (US); Christian Portal, Holliston, MA (US); Robert O. Aberg, South Grafton, MA (US); Patrick L. Edson, Newton, MA (US); Thomas Gaudette, Jamaica Plain, MA (US); Jennifer R. Lymneos, Hopedale, MA (US)

( * ) Notice: Subject to any disclaimer, the term of this patent is extended or adjusted under 35 U.S.C. 154(b) by 1173 days.

(21) Appl. No.: 10/846,225

(22) Filed: May 14, 2004

Related U.S. Application Data

(63) Continuation-in-part of application No. 09/954,872, filed on Sep. 18, 2001, now Pat. No. 6,993,772.

(51) Int. Cl.
   *G06G 7/48* (2006.01)
   *G06F 17/50* (2006.01)
   *G06F 9/44* (2006.01)
   *G06F 9/455* (2006.01)
   *G05B 15/02* (2006.01)
   *G05B 15/00* (2006.01)

(52) U.S. Cl. .......... 703/6; 703/13; 703/14; 703/21; 703/24; 700/9; 700/10; 700/83

(58) Field of Classification Search .............. 703/4, 20, 703/21, 24, 6, 13, 14; 700/9, 10, 83
   See application file for complete search history.

(56) References Cited

U.S. PATENT DOCUMENTS

| | | | | |
|---|---|---|---|---|
| 5,432,871 A | * | 7/1995 | Novik | 382/232 |
| 5,764,546 A | * | 6/1998 | Bryant et al. | 702/108 |
| 5,850,536 A | * | 12/1998 | McLain, Jr. | 703/21 |
| 5,926,775 A | | 7/1999 | Brumley et al. | |
| 6,078,942 A | | 6/2000 | Eisler et al. | |
| 6,418,392 B1 | | 7/2002 | Rust et al. | |
| 6,615,365 B1 | | 9/2003 | Jenevein et al. | |
| 6,732,296 B1 | | 5/2004 | Cherny et al. | |
| 2002/0055972 A1 | | 5/2002 | Weinman | |
| 2003/0107595 A1 | * | 6/2003 | Ciolfi | 345/762 |

OTHER PUBLICATIONS

Instrument Control Toolbox: For Use with MATLAB, User's Guide Version 1, The Math Works, Nov. 2000.*

* cited by examiner

*Primary Examiner* — Jason Proctor
*Assistant Examiner* — Nithya Janakiraman
(74) *Attorney, Agent, or Firm* — Nelson Mullins Riley & Scarborough LLP

(57) ABSTRACT

A method of creating and using a hardware independent communication interface block for block diagram environments is disclosed. The communication interface block includes user-selectable parameters controlling how a system being modeled by a block diagram communicates with image and data acquisition devices and control instruments or other electronic device interfaced with an external system. Based on the user selected parameters, the communication interface block calls an appropriate constructor to create an instrument object or acquisition device object which is used to enable communication with the control instrument or acquisition device respectively. The instrument object/acquisition device object calls a software driver appropriate for the hardware interface of the control instrument/acquisition device. The use of a common interface block provides scalability and ease of use to the block diagram environment when interacting with control instruments and acquisition devices.

93 Claims, 14 Drawing Sheets

COMMUNICATION SYSTEM FOR USE WITH A BLOCK DIAGRAM ENVIRONMENT

RELATED APPLICATIONS

This application is a continuation-in-part of a pending United States application entitled "Communication System" (U.S. Ser. No. 09/954,872, filed on Sep. 18, 2001), the contents of which are hereby incorporated by reference in their entirety.

FIELD OF THE INVENTION

The illustrative embodiment of the present invention relates generally to communication systems and more particularly to a communication system providing an interface between a system being modeled by a block diagram and a control instrument or other image acquisition or data acquisition device connected to an external system.

BACKGROUND

In conventional instrumentation systems, a computer or other electronic device equipped with a processor communicates with control instruments such as oscilloscopes and function generators that can obtain data about dynamic real world systems under test. Users can model, simulate, or analyze data by establishing communication with the control instruments. Similarly, data acquisition devices such as multi-function input/output boards, dedicated digital i/o boards, sound cards and devices collecting data from network data sources and image acquisition devices such as an image capture boards, scanners and cameras collect data which may be utilized by electronic devices supporting block diagram environments. Users connect the computer or electronic device to the control instruments, data acquisition device or image acquisition device through various interface options depending upon the hardware interface implemented by the particular control instrument or acquisition device. Interface options include, but are not limited to, serial, general purpose interface bus (GPIB), virtual machine environment extended for instrumentation (VXI), VXI-GPIB, IEEE 1394, PCI, ISA and USB (Universal Serial Bus). The electronic device or computer system usually executes a software driver having a distinct API (Application Program Interface) appropriate for the hardware interface of the particular control instrument or acquisition device (the term "acquisition device" as used herein encompasses both image acquisition devices and data acquisition devices). The software driver includes a library of executable functions that a computer program may call to establish communication with the control instrument or acquisition device and control the parameters of communication.

Unfortunately the software drivers utilized in conventional instrumentation systems and for communication with data acquisition and image acquisition devices are unique for the protocol necessary to communicate with the hardware interface of the control instrument or acquisition device. For example, a control instrument with a serial interface cannot be accessed using a software driver appropriate for a GPIB interface. This requirement for customized drivers presents a problem when the control instruments or acquisition devices are combined with a block diagram environment. It is frequently necessary to send simulation data from a block diagram being executed in the block diagram environment to a control instrument or acquisition device. Similarly, it is also frequently necessary to receive data from the control instrument monitoring an external system or acquisition device for use in a simulation being run in a block diagram environment. In order to interact with a control instrument or acquisition device, a proper software driver must be utilized by the computer system or electronic device for communication. Conventional methods of representing the appropriate interface to the control instrument or acquisition device in a block diagram involve the use of customized blocks with a particular driver designated (e.g. a serial interface block, a GPIB interface block, etc.). Any change in the hardware interface required to contact the control instrument or acquisition device, such as the need to access a different control instrument monitoring the external system, requires the redesign of the block diagram, specifically the replacement of the interface block for the interface hardware and the use of a different driver. If the block diagram is being used to generate executable code, the change in interface block requires a regeneration of the code following the substitution of the new interface block. Both of these changes hinder the scalability and ease of use block diagrams in communicating with control instruments and acquisition devices.

BRIEF SUMMARY

The illustrative embodiment of the present invention provides a hardware independent communication interface block for block diagram environments. The communication interface block includes user-selectable parameters controlling how a system being modeled by a block diagram communicates with acquisition devices and control instruments or other electronic device interfaced with an external system. Based on the user selected parameters, the communication interface block calls an appropriate constructor to create an instrument object or acquisition device object which is used to enable communication with the control instrument or acquisition device respectively. The instrument object/acquisition device object calls a software driver appropriate for the hardware interface of the control instrument/acquisition device. The use of a common interface block provides scalability and ease of use to the block diagram environment when interacting with control instruments and acquisition devices.

In one embodiment in a block diagram environment, a method provides a block diagram of a system. The block diagram includes a hardware independent communication interface block representing an interface between the system and a control instrument. Block parameters for the communication interface block are selected and used to programmatically create an instrument object. The instrument object calls a driver appropriate for communication with the particular hardware interface of the control instrument.

In another embodiment in a block diagram environment, a method provides a block diagram of a system. The block diagram includes a hardware independent communication interface block representing an interface between the system and one of a data acquisition device or image acquisition device. Block parameters for the communication interface block are selected and used to programmatically create an acquisition device object or image acquisition device object. The acquisition device object or image acquisition device object calls a driver appropriate for communication with the particular hardware interface of the image acquisition device or data acquisition device.

In an embodiment in an electronic device, a system includes a block diagram environment holding at least one block diagram of a system being modeled. The block diagram includes at least one hardware independent communication interface block representing an interface between the system and an external device. The external device includes a hardware interface. The communication interface block includes user-selectable parameters which are used to programmatically create an object based on the parameters. The created object calls a driver appropriate for communication with the hardware interface of the external device. The system also includes an interface between the electronic device holding the block diagram environment and the external device.

DETAILED DESCRIPTION

Figure 1:
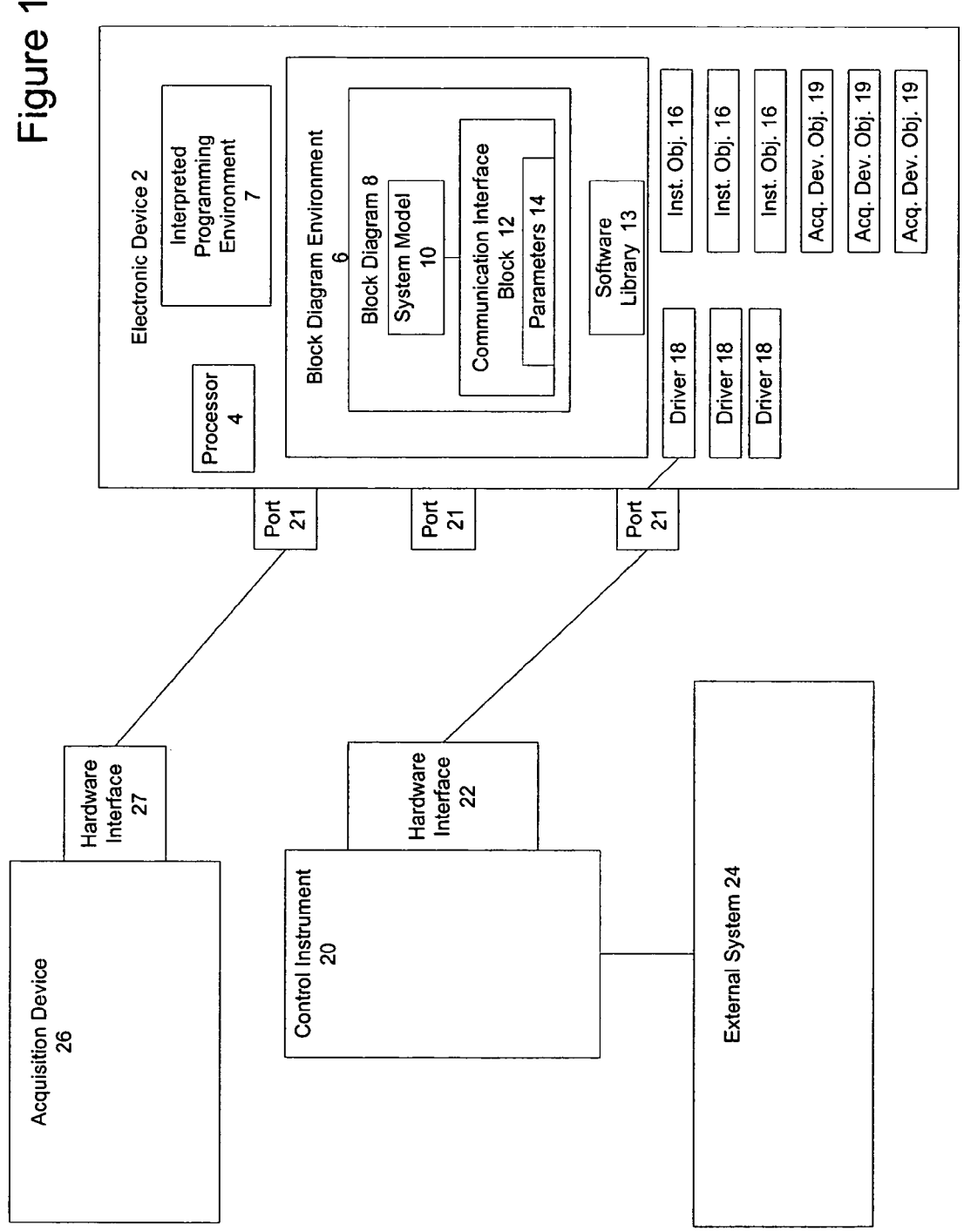
FIG. 1 depicts an environment suitable for practicing the illustrative embodiment of the present invention.

Pending United States Application, "Communication System", describes the use of a common communication interface used with an interpretive computing environment (such as MATLAB™ from The MathWorks of Natick, Mass.) to facilitate the flow of data between the interpretive computing environment and a control instrument. The control instrument may be connected to an external system such as an external system under test. The contents of "Communication System" are incorporated herein in their entirety. The illustrative embodiment of the present invention extends the concepts discussed in "Communication System" to encompass the use of a communication interface block in a block diagram environment (such as Simulink™ from The MathWorks of Natick, Mass.). The illustrative embodiment of the present invention allows a user to simplify communication between a block diagram in a block diagram environment with control instruments and acquisition devices independent of the various types of interface bus standards, communication protocols, or types of interface hardware.

Prior to discussing the illustrative embodiment of the present invention in detail, it may be helpful to first discuss block diagrams. Various classes of block diagrams describe computations that can be performed on application specific computational hardware, such as a computer, microcontroller, FPGA, and custom hardware. Classes of such block diagrams include time-based block diagrams, such as those found within Simulink®, from The MathWorks, Inc. of Natick, Mass., state-based and flow diagrams, such as those found within Stateflow®, from The MathWorks, Inc. of Natick, Mass., and data-flow diagrams. A common characteristic among these various forms of block diagrams is that they define semantics on how to execute the diagram. It should be appreciated that although the examples contained herein are discussed with reference to Simulink®, the term "block diagram" as used herein should be read broadly to include the different classes of block diagrams whenever the context allows.

Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages, such as Simulink®. Such packages provide sophisticated software platforms with a suite of support tools that makes the analysis and design of dynamic systems more efficient, methodical, and cost-effective.

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc. Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of block diagram models in the development, analysis, and validation of dynamic systems.

Depending on the semantics associated with the execution of a block diagram and its components, the block diagram may be used to represent a computer program in a graphical manner. In general, a set of sequential and parallel executions can be represented in such block diagram fashion. Graphical programming environments that facilitate the use of block diagrams may provide additional graphical associations and constructs that are different and complementary to those of block diagrams.

FIG. 1 depicts an environment suitable for practicing the illustrative embodiment of the present invention. An electronic device 2 equipped with a processor 4 includes a block diagram environment 6. The electronic device 2 may be any of multiple types of computer systems such as a workstation, laptop, server, mainframe, or other type of electronic device equipped with a processor such as a PDA or network attached appliance capable of supporting the block diagram environment 6. The block diagram environment 6, such as Simulink® from The MathWorks of Natick, Mass., holds at least one block diagram 8. The block diagram environment 6 may interact with a separate interpreted programming environment 7, such as MATLAB® from The MathWorks of Natick, Mass. The block diagram 8 includes the graphical depiction of a system model 10 and also includes a communication interface block 12 connected to the system model 10. Different types of communication interface blocks 12 are used to communicate with acquisition devices and control instruments as explained further below. The communication interface block 12 includes parameters 14. The parameters 14 may be selected by a user to control communication between the system model 10 and a control instrument or acquisition device the model needs to contact.

Also shown in the electronic device 2 is an instrument object 16 generated by the communication interface block 12. The instrument object 16 calls a software driver 18 to communicate with a control instrument 20 via the hardware interface 22 of the control instrument and a port 21 of the electronic device 2. The control instrument 20 may be an oscilloscope, function generator, analyzers, calibrators, counter/timers, DMMs, generators, power supplies, scanners and switches and sources or similar devices. The instrument object 16 is used to perform instrument control and is instantiated during the initialization phase of the block diagram 8 when the communication interface block is processed. The instrument objects 16 are based on the user-selected parameters 14. A constructor for the instrument object 16 is called based on which parameters 14 were chosen. Similarly, an acquisition device object 19 may be generated by a communication interface block for communication with an acquisition device 26 equipped with a hardware interface 27 in the same manner. The acquisition device 26 may be connected to an external system.

The class definitions for the instrument object 16 and acquisition device object 19 may be stored in a software library 13. Examples of such software libraries 13 in a Simulink® environment are the Instrument Control Toolbox, Image Acquisition Toolbox and Data Acquisition Toolbox, plug-in modules adding additional functionality to Simulink®. Thus, a user may cause the generation of a serial instrument object, IEEE 1394 instrument object, VISA instrument object or other type of instrument object as necessary for communication with the control instrument 20 depending on which parameters the user selected. The software driver 18 that is called is determined by the type of instrument object 16 that is instantiated as a result of the selected parameters. Each different type of instrument object 16 utilizes a software driver appropriate for communicating with the control instrument 20. Similarly, the class definitions for the acquisition device objects 19 provide the type of object necessary to communicate with particular types of data and image acquisition devices.

The control instrument 20 is interfaced with an external system 24 such as a system under test. The external system 24 is "external" in the sense that it is external to the block diagram environment 6. The hardware interface and the control instrument may be completely contained within the electronic device 2. Similarly, the block diagram environment 6 may be contained within the control instrument as a separate application or process.

The three ports 21 shown on the electronic device 2 may each use a different communication protocol. The ports represent physical and logical end points to which data transmitted between devices/processes may be addressed. Examples of physical ports include the parallel and serial ports found on extension cards built in to the motherboards of most desktop and laptop computer systems. Logical ports are internal addresses designated as recipients of data intended for specific processes or applications. Ports may support one or more types of communication protocols. The user selects the port type when selecting the parameters 14 of the communication interface block 12. A different instrument object 16/acquisition device object 19 appropriate for the communication protocol used by each destination hardware interface 22 and 27 of the control instrument 20/acquisition device 26 and corresponding port 21 is necessary for communication between the external instrument/device and the block diagram Those skilled in the art will recognize that while the examples contained herein discuss separate generic control instrument communication interface blocks and generic acquisition device communication interface blocks from which the user selects parameters in order to generate instrument objects and acquisition device objects respectively, the present invention may also be implemented as a single generic communication interface block from which the user selects either an acquisition device option or an instrument control option prior to selecting the parameters. The illustrative embodiment of the present invention enables the block diagram to quickly create different instrument objects 16/acquisition device objects 19 in response to a user adjusting the parameters 14 in the communication interface block 12. Those skilled in the art will recognize that the more than one communication interface block 12 may be part of the block diagram 8 and that more than one control instrument may be connected to the external system 24. Similarly, the illustrative embodiment of the present invention may enable more than one external system to be accessed from the block diagram environment 6.

Those skilled in the art will further appreciate that the control instrument 20/acquisition device 26 may be remotely located from the electronic device 2 and may be accessed by a network such as a Wide Area Network (WAN), Local Area Network (LAN), the Internet, or some other type of network. Similarly, a number of different mechanisms may be used to connect the electronic device 2 and the control instrument 20/acquisition device 26 such as a physical connection or wireless signal without departing from the scope of the present invention. Additionally, those skilled in the art will recognize that the various components depicted in FIG. 1 such as the software library 13, instrument object 16, acquisition device object 19 and driver 18 may be present in a remote location accessible to the block diagram environment 6.

Figure 2A:
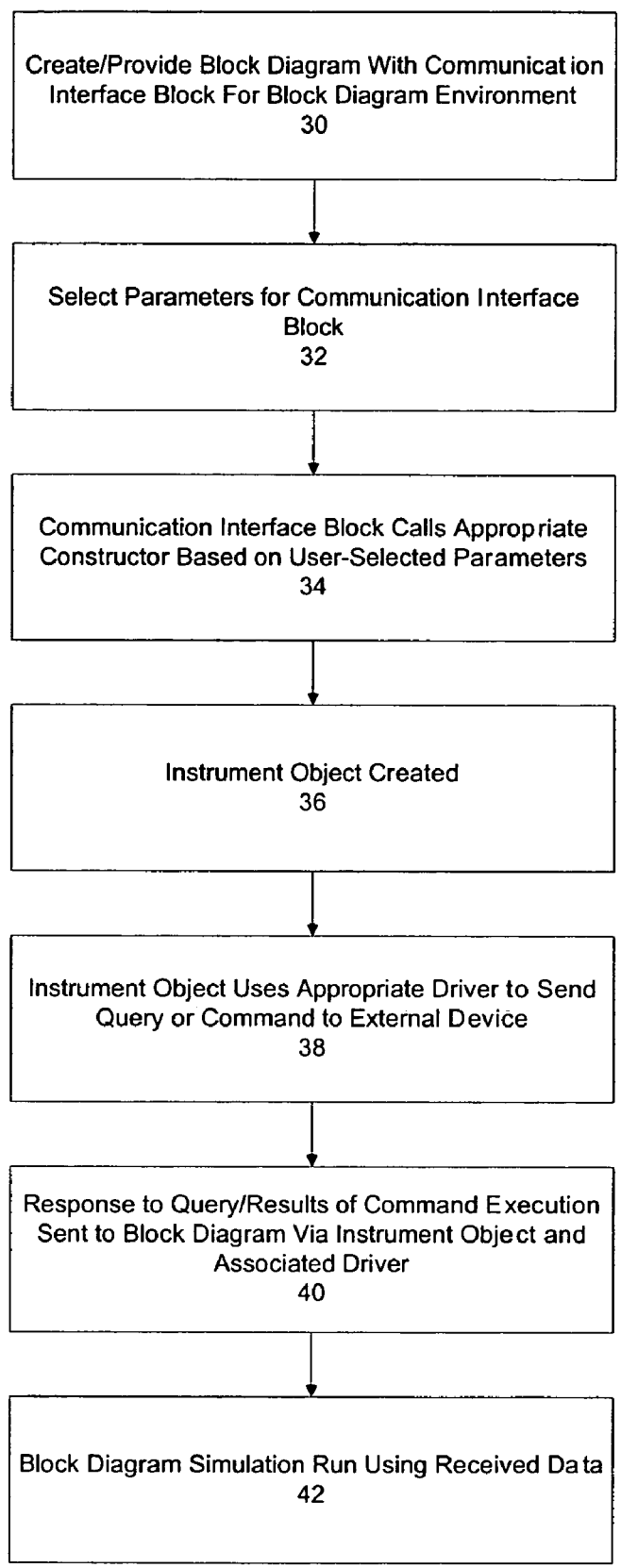
FIG. 2A is a flow chart of the sequence of steps followed by the illustrative embodiment of the present invention to utilize a communication interface block to facilitate communication between a block diagram environment and a control instrument.

FIG. 2A is a flow chart of the sequence of steps followed by the illustrative embodiment of the present invention to utilize the communication interface block 12 to facilitate communication between a system model 10 in a block diagram 8 and the control instrument 20. The sequence begins with the creation or retrieval of a block diagram 8 which includes a communication interface block 12 for the block diagram environment 6 (step 30). The user selects parameters 14 for the communication interface block 12 (step 32). The parameters 14 include selecting the type of protocol used to communicate with the hardware interface 22 of the control instrument 20 or other device connected to the external system 24. Parameters 14 also include commands and instructions associated with the sending and receiving of data as discussed further below. The communication interface block 12 calls the appropriate constructor needed to create an instrument object 16 able to communicate with the control instrument 20 (step 34). The instrument object 16 is then instantiated in response to the constructor called (step 36).

The instrument object uses the appropriate driver to send a query or a command to the control instrument (step 38). The driver is the appropriate driver for the type of hardware interface 22 being utilized by the control instrument 20. For example, based upon the user selected parameters 14 an instrument object 16 able to communicate with a control instrument 20 utilizing a serial hardware interface 22 may be created. Alternatively, if the external device is utilizing a GPIB interface, the instrument object 16 that is instantiated in response to different user selected parameters 14 will be able to utilize the GPIB driver 18. The response to the query or results of the command execution may then be sent back to the block diagram 8 via the instrument object and the associated driver (step 40). A block diagram simulation may then be run using received data (step 42). Those skilled in the art will recognize that the communication interface block 12 may also be used to send simulation data from the model simulation to the control instrument 20.

Figure 2B:
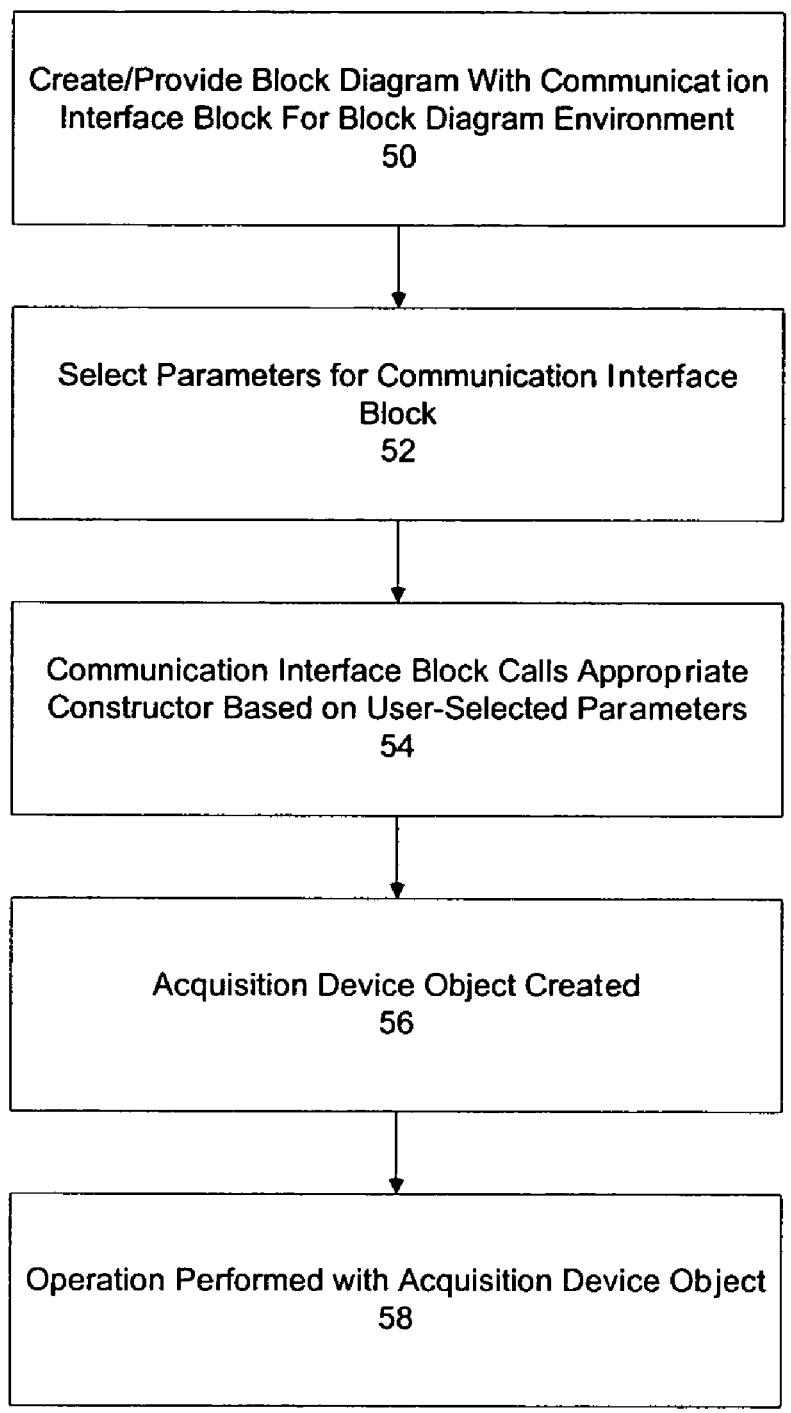
FIG. 2B is a flow chart of the sequence of steps followed by the illustrative embodiment of the present invention to utilize a communication interface block to facilitate communication between a block diagram environment and an acquisition device.

The process used to transmit data between a data or image acquisition device and a block diagram is similar in that it also involves the generation of a new object by a communication interface block. FIG. 2B is a flow chart of the sequence of steps followed by the illustrative embodiment of the present invention to utilize a communication interface block to facilitate communication between a system model in a block diagram and the acquisition device 26. The sequence begins with the creation or retrieval of a block diagram which includes a communication interface block for the block diagram environment (step 50). The communication interface block may be an analog input block, analog output block, digital input block or digital output block. The differences between the four types of blocks is discussed further below. The user selects parameters for the communication interface block (step 52). The parameters include commands and instructions associated with the sending and receiving of analog and digital data to and from a block diagram system model. The communication interface block calls the appropriate constructor needed to create an acquisition device object able to communicate with the image or data acquisition device (step 54). The acquisition device object 16 is then instantiated in response to the constructor called (step 56) and used to perform the desired operation with the acquisition device (i.e.: either sending data from the model simulation to the acquisition device or receiving data from the acquisition device for use in the model simulation) (step 58). Those skilled in the art will recognize that the terms data and image acquisition are used broadly to encompass data output as well as data input.

For image acquisition and data acquisition, the communication interface block may be one of an analog input, analog output, digital input and digital output communication interface block depending upon the acquisition device and the operation being performed. For example, the blocks may be used for video input and video output. The analog input block provides an interface for collecting data from an acquisition device and presenting it to a Simulink® model. The analog input block has no input ports (since data is flowing into the model and not from the model to the block) and the number of output ports is based on the number of channels selected for the acquisition device.

The analog input block accepts parameters outlining the properties of the acquisition device. The block parameters include buffer length (the length of the data to collect and use according to a specified output action), an output action (what to do after the data collected has been output to the model), the adaptor (the name of the manufacturer of the hardware that the user wishes to communicate with), and the hardware ID (a board number defined by the vendors API). The adaptor name and ID may be used by the acquisition device object in conjunction with a lookup table to determine acquisition device information including the proper communication protocol to use during the transmission of data. The parameters additionally include a sample rate (the sample rate to collect the data with) the type of input for each of the channels, and channel selection (indicating which channels are being used). The analog input block parameters may also include the list of channels the user wishes to use or the list of channels the hardware has available, a list of hardware channels and their names, the range of each input channel, the name of a data acquisition device object defined in the MATLAB workspace, the frame size (the number of samples to output per time period of the simulation for each channel). The user may also use a MATLAB® object to define an object associated with the analog input block and specify the number of output frames of data per Simulink® time point. In one implementation, default values are supplied for the analog input block.

Figure 3A:
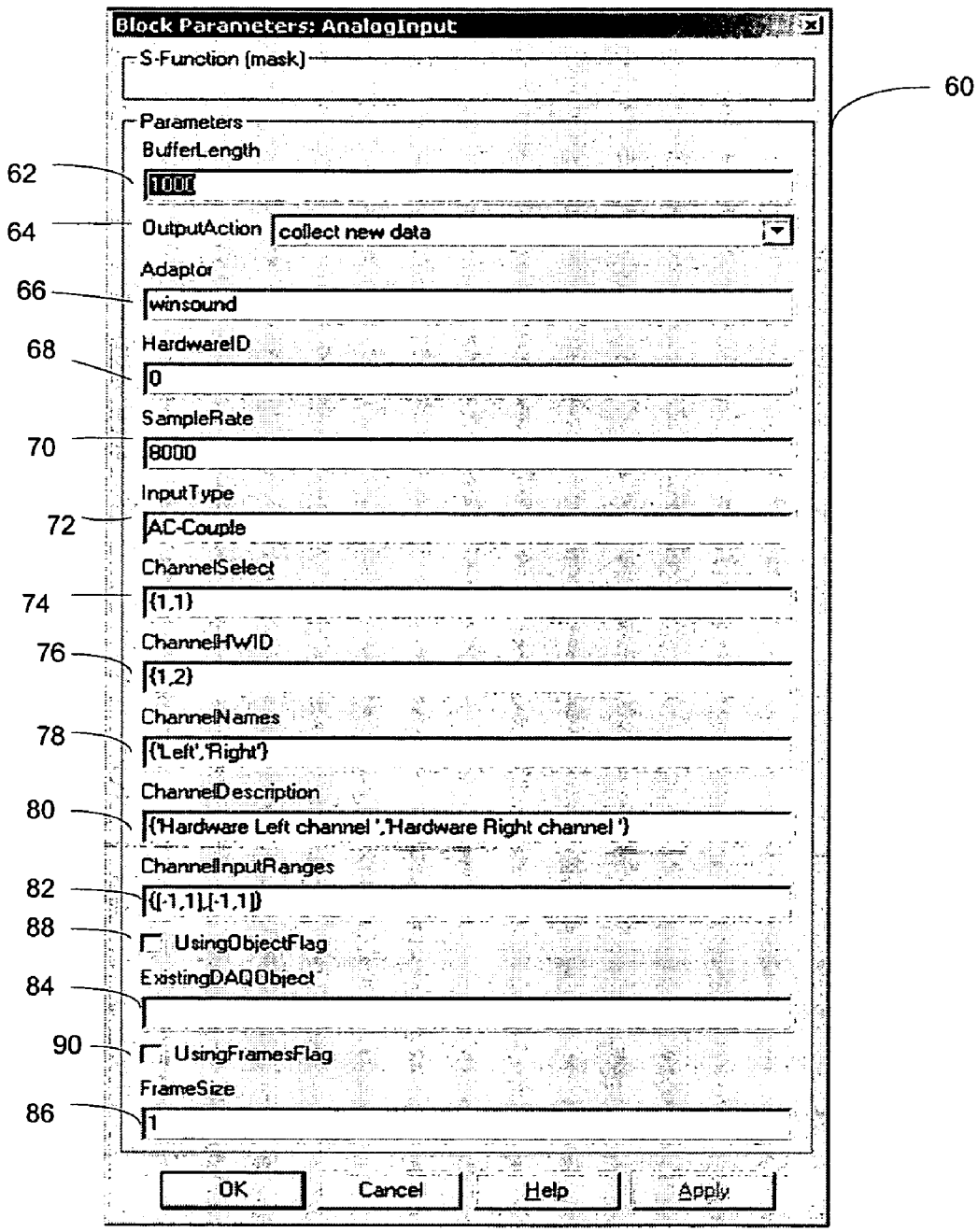
FIG. 3A depicts a dialog box used to make parameter selections for an analog input communication interface block.

The illustrative embodiment of the present invention allows a user to select parameters for the communication interface block 12 via a dialog box or other interface allowing a user to input parameters 14. The parameters control the type of object that is instantiated for communication with a control instrument 20 or acquisition device 26. FIG. 3A depicts a dialog box 60 used to make parameter selections for the analog input communication interface block. The dialog box includes text boxes, check boxes and a pull down menu for a user to enter/select values for buffer length 62, an output action 64, the adaptor 66, the hardware ID 68, a sample rate 70, input type 72, channel selection 74, the list of channels the user wishes to use or the list of channels the hardware has available 76, channel names 78, channel description 80, channel input ranges 82, the name of a data acquisition device object defined in the MATLAB workspace 84, and the frame size 86. The user may also use a MATLAB® object (which may be either a data acquisition device object or image acquisition device object) to define the object associated with the analog input block by selecting a flag 88 and specify the number of output frames of data per Simulink® time point 90.

The illustrative embodiment of the present invention includes an analog output communication interface block that provides an interface for outputting data calculated using a Simulink® model during a simulation to a data acquisition device. The number of input ports is based on the number of channels selected for the acquisition device. The analog output block has no output ports as data is being sent to the acquisition device and not to the model by the block. The analog output block also accepts parameters outlining the properties of the acquisition device. The analog output parameters are the same as those mentioned for the analog input block with the exception of the parameters to specify output conditions of data to the model which are not available (data is being sent to the acquisition device not to the model). In one implementation, default values are supplied for the analog output block.

Figure 3B:
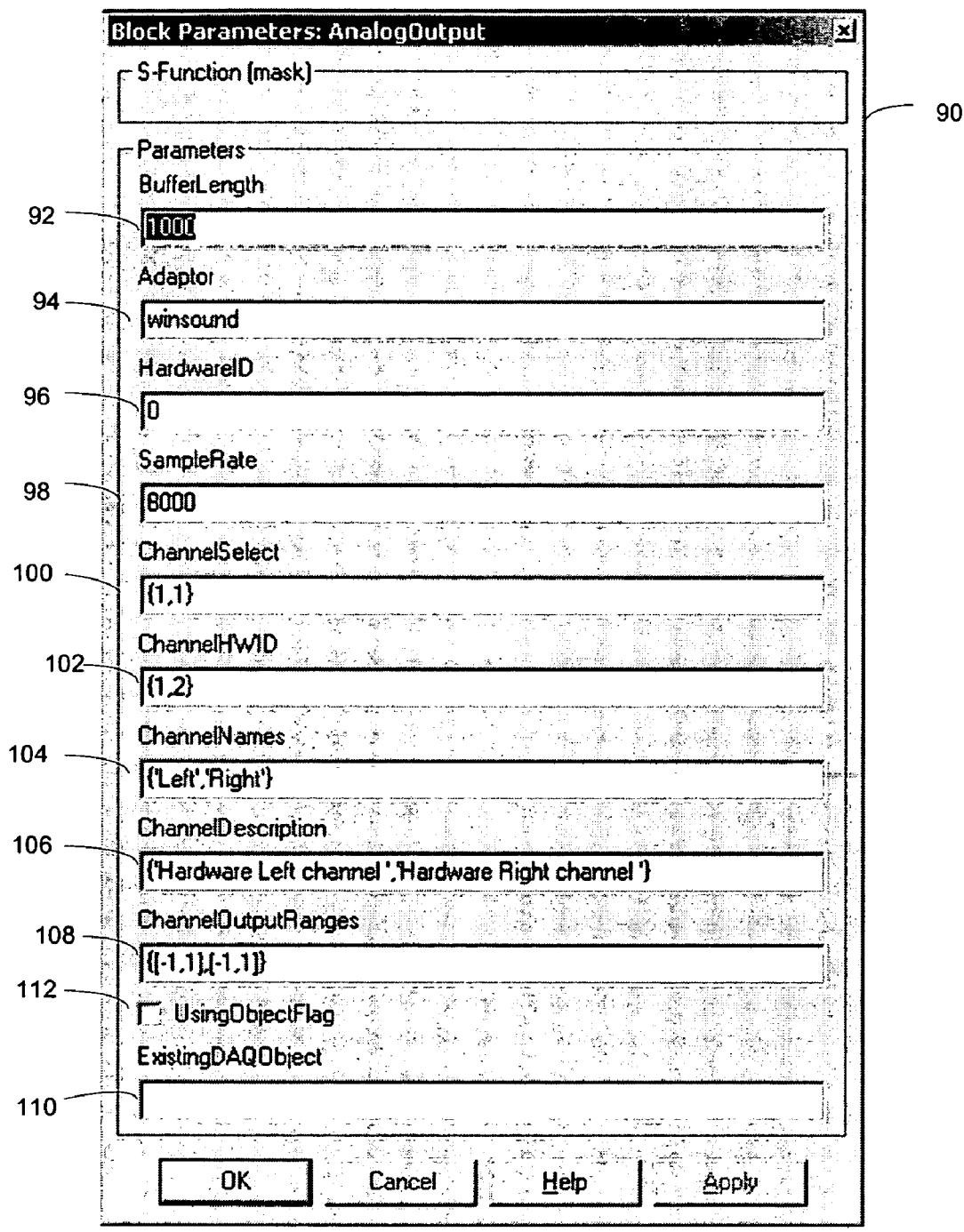
FIG. 3B depicts a dialog box used to make parameter selections for an analog output communication interface block.

FIG. 3B depicts a dialog box 90 used to make parameter selections for the analog output communication interface block. The dialog box includes text boxes and a check box for a user to enter/select values for buffer length 92, the adaptor 94, the hardware ID 96, a sample rate 98, channel selection 100, the list of channels the user wishes to use or the list of channels the hardware has available 102, channel names 104, channel description 106, channel output ranges 108, and the name of an data acquisition device object defined in the MATLAB workspace 110 associated with the block. The user may also use a MATLAB® object to define the object associated with the analog output block by selecting a flag 112.

The digital input block of the illustrative embodiment of the present invention provides an input for collecting digital data from an acquisition device and presenting the digital data to a Simulink® model during simulation. The number of output ports in the digital input block is dependent upon the number of lines for the acquisition device. The output line has the value of either 1 or 0 on each line indicating whether the line is being used. The digital input block also accepts parameters outlining the properties of the acquisition device. Parameters for the digital input block include the adaptor name and ID, a line select parameter (indicating which channels are being used on the hardware interface), a listing of desired or available lines, their description and their names, the input range for each lines, an object defined in a MATLAB workspace associated with the block, and the use of a MATLAB object to define the associated object. In one implementation, default values are supplied for the digital input block.

Figure 3C:
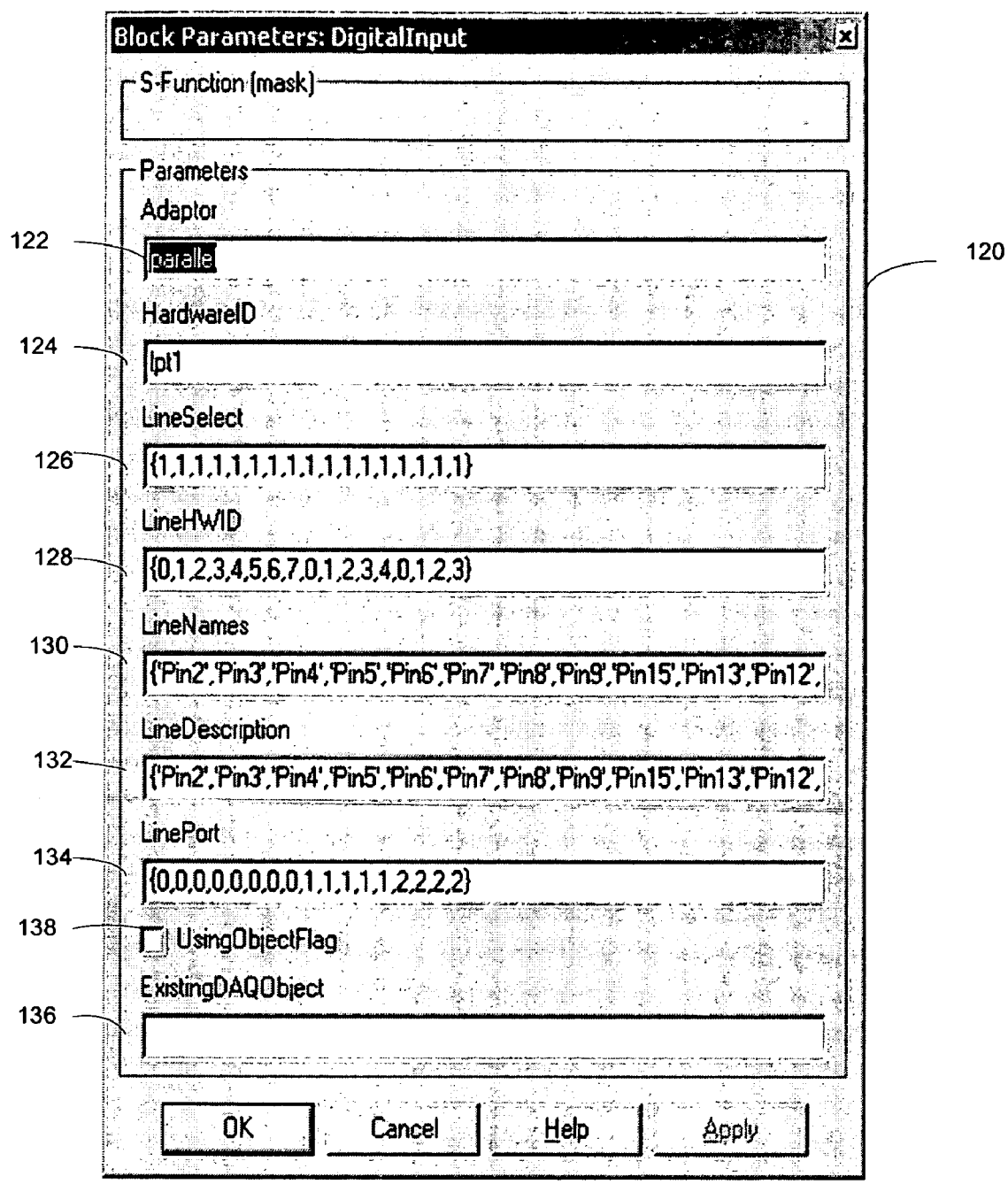
FIG. 3C depicts a dialog box used to make parameter selections for an digital input communication interface block.

FIG. 3C depicts a dialog box 120 used to make parameter selections for the digital input communication interface block. The dialog box includes text boxes and a check box for the user to indicate parameter values for the adaptor 122, the hardware ID 124, a line select parameter 126, a listing of desired or available lines 128, line names 130, and line description 132, the input range for each line 134, and the name of an data acquisition device object defined in the MATLAB workspace 136 associated with the block. The user may also use a MATLAB® object to define the object associated with the digital input block by selecting a flag 138.

The illustrative embodiment of the present invention also includes a digital output block that provides an interface for outputting digital data that was calculated during a model simulation to an acquisition device. The number of input ports is based on the number of lines selected for the device and the state of the MUX (Multiplex) input check box selected by the user. If the MUX Input box is selected then the block has one input port with a width of the number of lines. If the MUX input box is not selected then the block has the same number of input ports as active lines on the device. The digital output block has no output ports. The digital output block also accepts parameters outlining the properties of the acquisition device and a MATLAB® workspace variable name representing an acquisition device object. The digital output parameters are the same as those mentioned for the digital input block. In one implementation, default values are supplied for the digital output block.

Figure 3D:
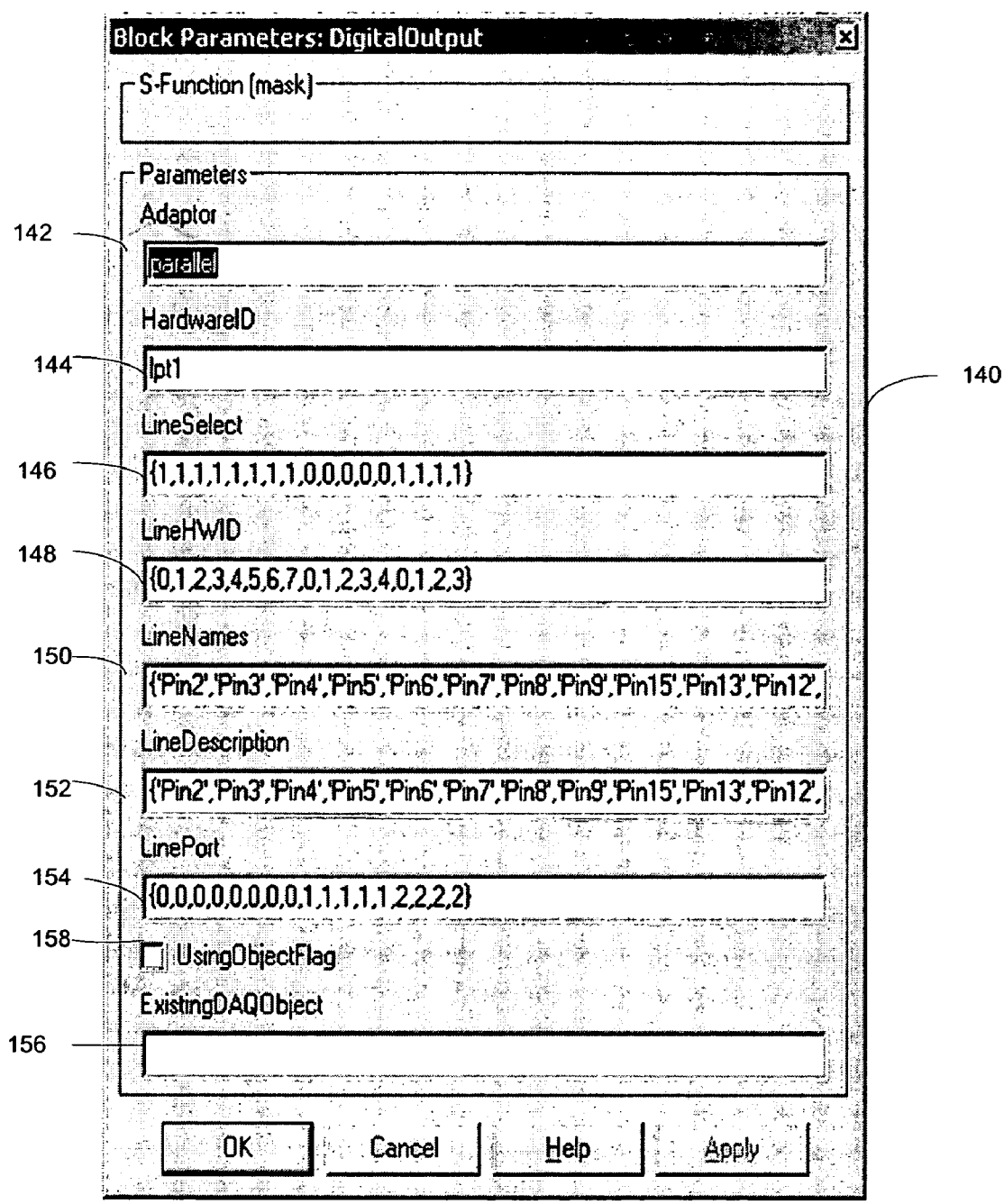
FIG. 3D depicts a dialog box used to make parameter selections for an digital output communication interface block.

FIG. 3D depicts a dialog box 140 used to make parameter selections for the digital output communication interface block. The dialog box includes text boxes and a check box for the user to indicate parameter values for the adaptor 142, the hardware ID 144, a line select parameter 146, a listing of desired or available lines 148, line names 150, and line description 152, the input range for each line 154, and the name of an data acquisition device object defined in the MATLAB workspace 156 associated with the block. The user may also use a MATLAB® object to define the object associated with the digital output block by selecting a flag 158.

Those skilled in the art will recognize that an important aspect in handling data being input to a simulation involves dealing with the end of the data stream. The illustrative embodiment of the present invention includes three ways of handling incoming data with the analog input and digital input blocks. The data may be provided in an endless loop to the simulation until the end of the simulation by "looping" around to the beginning of the data stream and retransmitting the stream. Alternatively, the last input data value may be repeatedly transmitted until the end of the simulation. The acquisition device may also be requested to send additional data. The data received from the acquisition device may be any type of data that may be used by the block diagram. The data may include multi-dimensional image data captured in real-time using multiple communication channels. The user may choose the method of handling the end of the data stream by selecting a parameter in the communication interface block.

Figure 4:
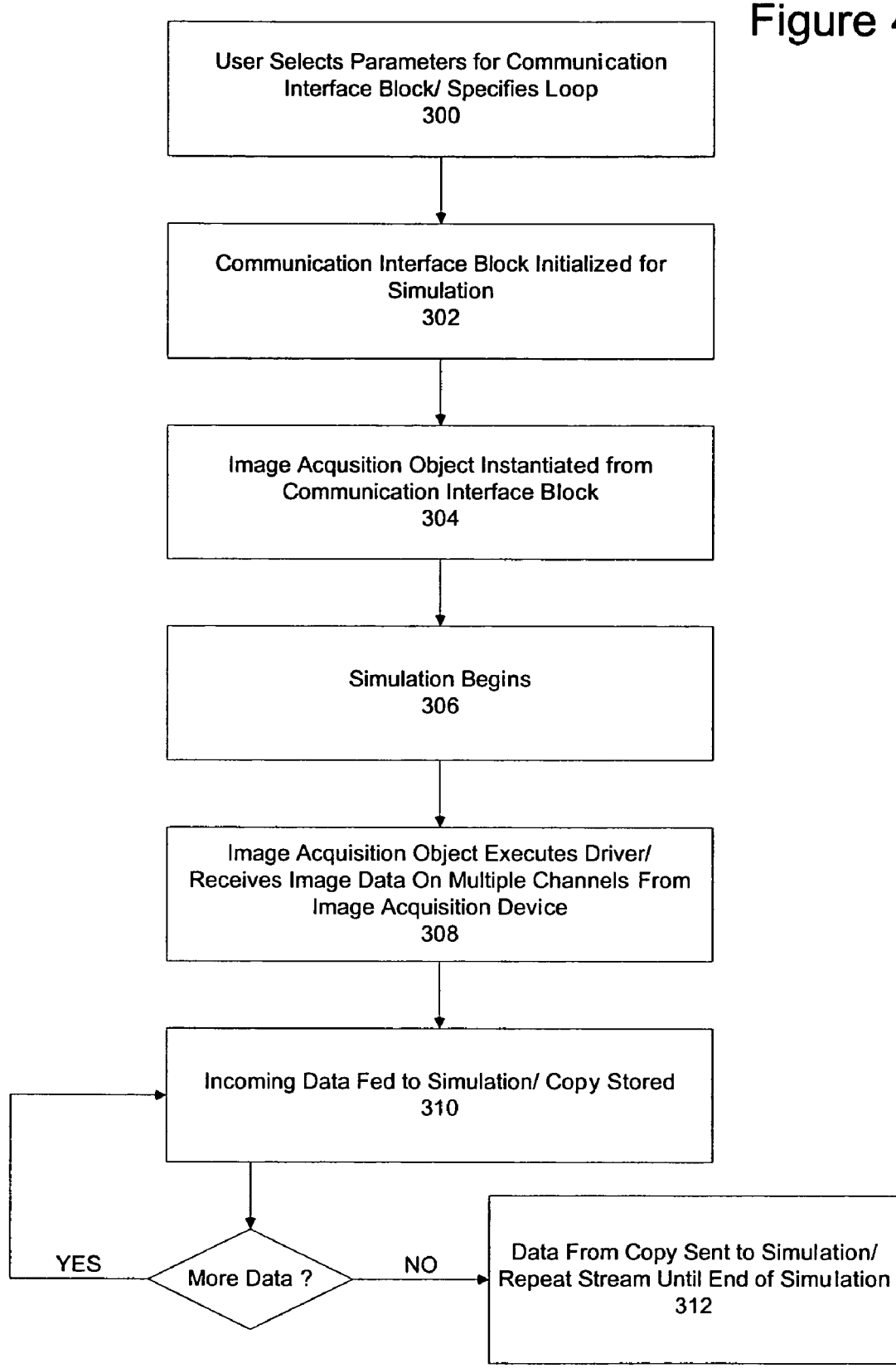
FIG. 4 is a flow chart of the sequence of steps followed by the illustrative embodiment of the present invention to utilize a image acquisition device object instantiated from a communication interface block to facilitate communication between a block diagram environment and an image acquisition device.

One of the methods of handling the end of the data stream may be seen in FIG. 4. Those skilled in the art will recognize that the method of handling the end of the data stream is dictated by the user-selected parameter chosen by the user prior to the beginning of the simulation. The sequence begins when the user selects parameters of a communication interface block designed to communicate with an image acquisition device such as a camera and specifies the loop method of handling the end of image data stream (step 300). The communication interface may be one of a number of different interfaces including USB, Firewire, BEE-1394 IIDC Digital Camera (DCAM), Ethernet, wireless, and different vendor SDKs (Software Development Kits). The communication interface block is then initialized prior to the simulation of the block diagram (step 302). The initialization of the communication interface block causes an image acquisition device object appropriate for facilitating communication between the block diagram simulation and the camera to be instantiated (step 304). The simulation begins (step 306) and the image acquisition device object executes the appropriate driver to retrieve image data from the camera over multiple channels as specified in the user selected parameters (step 308). The incoming image data is forwarded to the simulation of the block diagram as input data and a copy of the data is stored (step 310). While the incoming image data stream continues (step 311) it is fed to the simulation and copies are made and stored. Upon the ending of the data stream from the image acquisition device, the previously selected user parameter dictates how the ongoing simulation is fed additional image data. Since the loop method was specified by the user during the selection of parameters, the stored image data is fed sequentially to the simulation until the simulation end (step 312). In the event the stored image data is exhausted prior to the end of the simulation, the process repeats from the beginning of the stored stream.

Figure 5A:
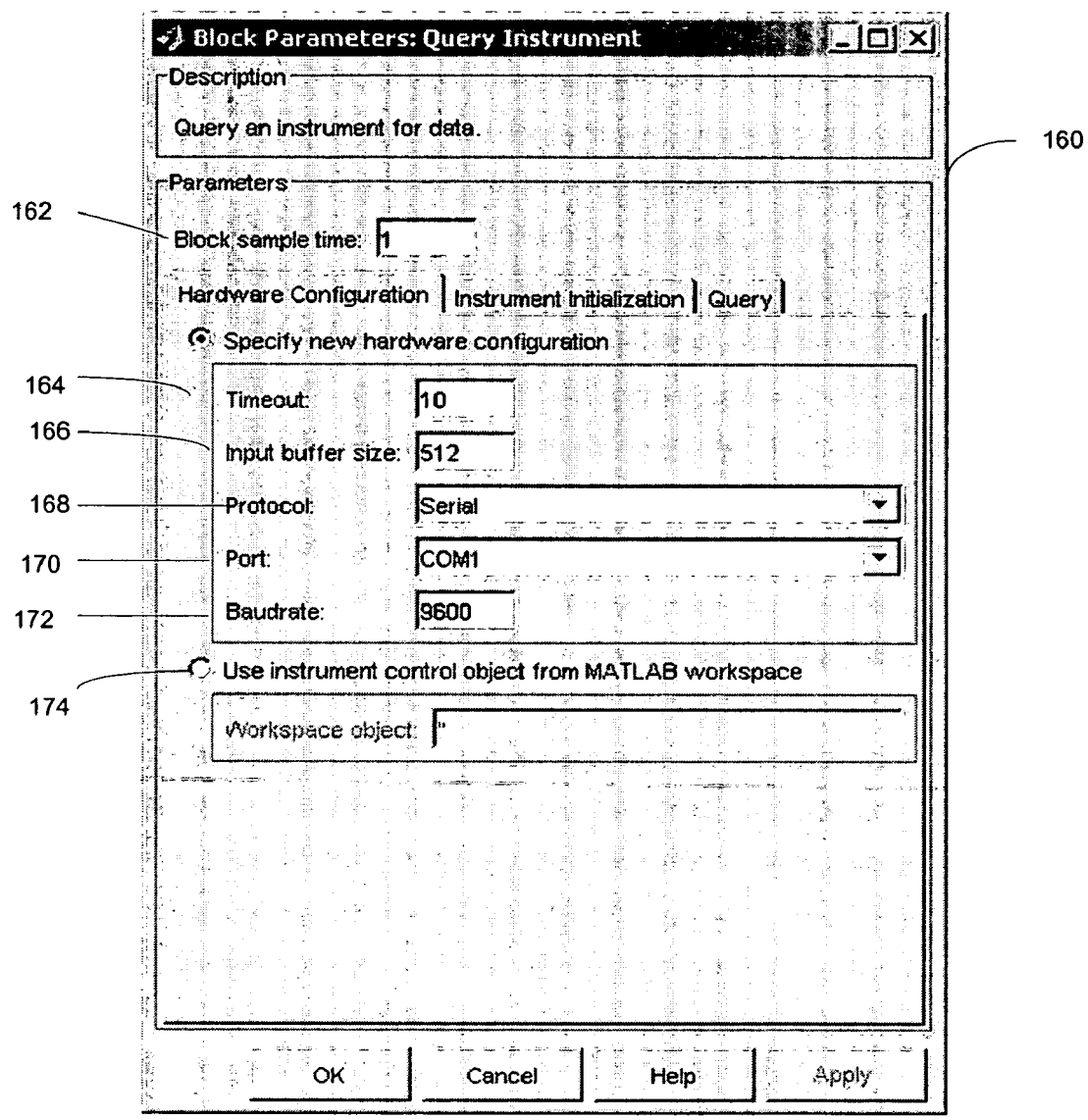
FIG. 5A depicts a user interface in the illustrative embodiment of the present invention enabling a user to select hardware configuration parameters for the communication interface block used in a control instrument query operation.

The illustrative embodiment of the present invention also allows a user to select parameters in a communication interface block to request data from a control instrument. FIG. 5A depicts the user interface used by the illustrative embodiment of the present invention to select a number of parameters related to the querying of the control instrument by the system model. The user interface 160 enables a user to select a block sample time 162 (indicating when and how often a block executes), specify a timeout duration (indicating the time duration for which communication will be attempted between devices/processes prior to reporting failure of the communication) 164, specify the size of an input buffer (indicating the amount of incoming data received from a transmitting device to be temporarily stored prior to processing) 166, and specify the type of communication protocol to use in communicating with the control instrument 168. The communication protocol may be a serial communication protocol, GPIB communication protocol, VXI communication protocol, GPIB-VXI protocol, VISA protocol, USB/VISA, TCP/VISA, FieldBus, CANBus or some other type of protocol as is known in the art. The user may also specify the port 170, and the baud rate 172. Alternatively, the user may select an instrument control object which has already been created and saved in the MATLAB workspace 174. The selected parameters are used by the communication interface block upon initialization to create the instrument control object used to communicate with the control instrument.

Figure 5B:
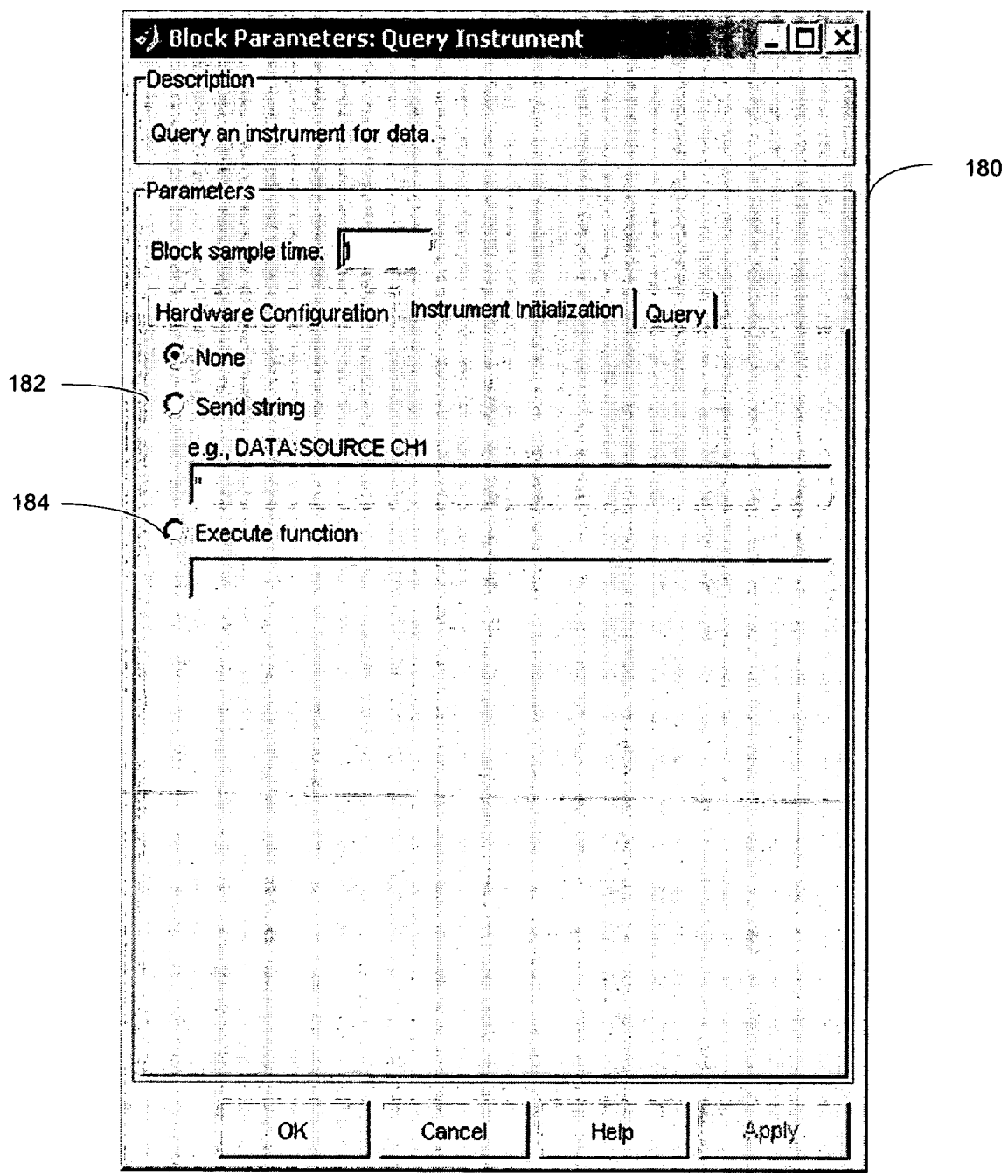
FIG. 5B depicts a user interface in the illustrative embodiment of the present invention enabling a user to select instrument initialization parameters for the communication interface block used in a control instrument query operation.

The user may also select parameters related to the initialization of the control instrument prior to sending a query. FIG. 5B depicts an additional view 180 whereby the user may specify parameters involved in instrument initialization. The parameters may include a string (a group of characters manipulated by the receiving process as a group) 182 or specify a function such as a MATLAB function to be executed upon the instrument being initialized 184.

Figure 5C:
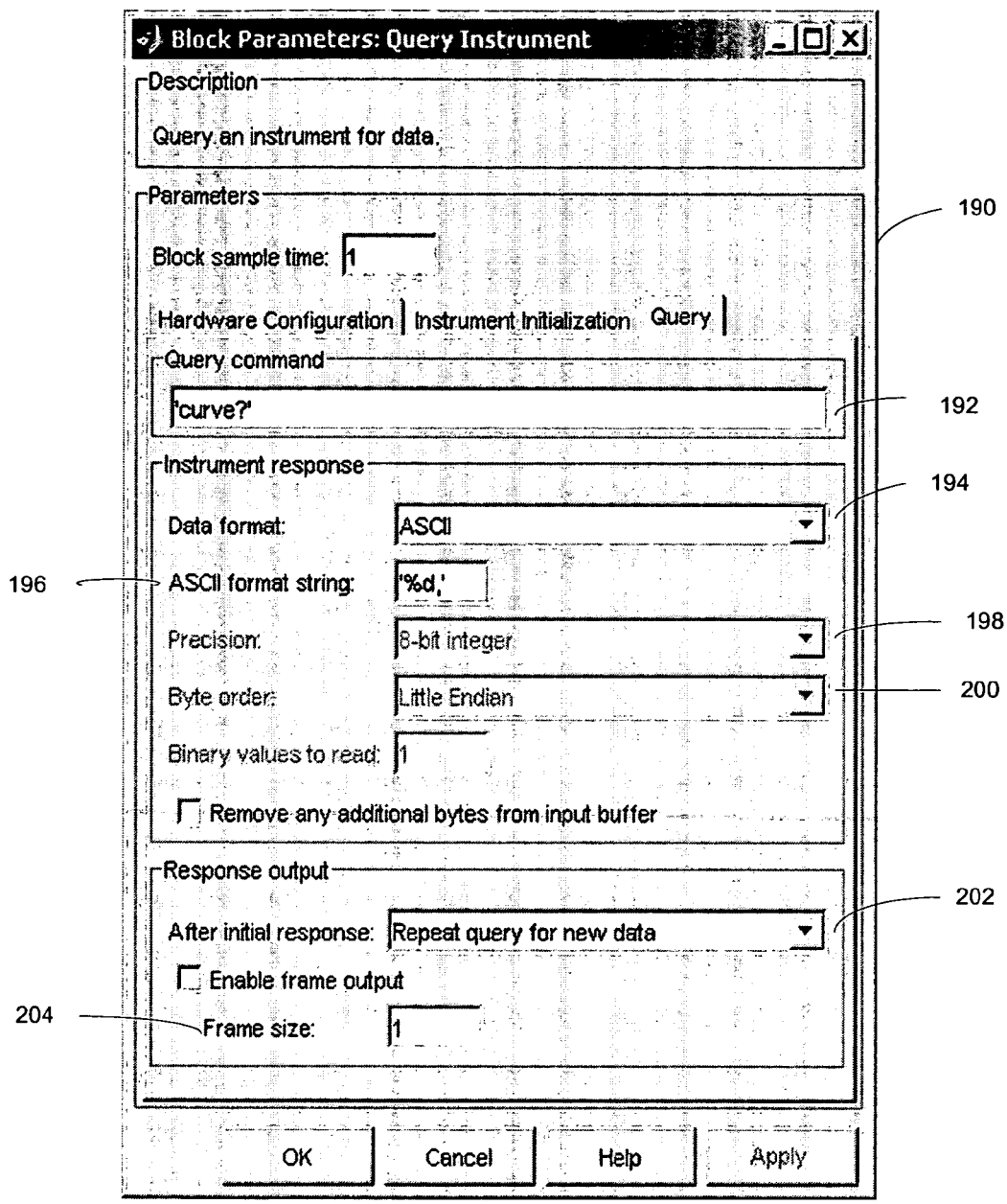
FIG. 5C depicts a user interface in the illustrative embodiment of the present invention enabling a user to select query parameters for the communication interface block used to contact a control instrument.

FIG. 5C shows an additional view 190 utilized by the illustrative embodiment of the present invention that enables a user to select parameters used in the querying of the control instrument. The parameters include a query command 192 (such as the shown 'curve?') and may also include parameters associated with the response by the instrument. The parameters associated with the response by the instrument include the data format 194 the instrument should use in responding, such as an UINT8, UINT16, or ASCII format, and may specify an ASCII format string 196. Additional parameters which include the numerical precision with which data should be formatted in by the control instrument in the response may be specified 198, as may the byte order 200 (e.g. Big Endian, Little Endian). The user is also able to specify the repetition of the original query 202 and indicate the frame size that should be utilized in the communication 204.

Figure 6A:
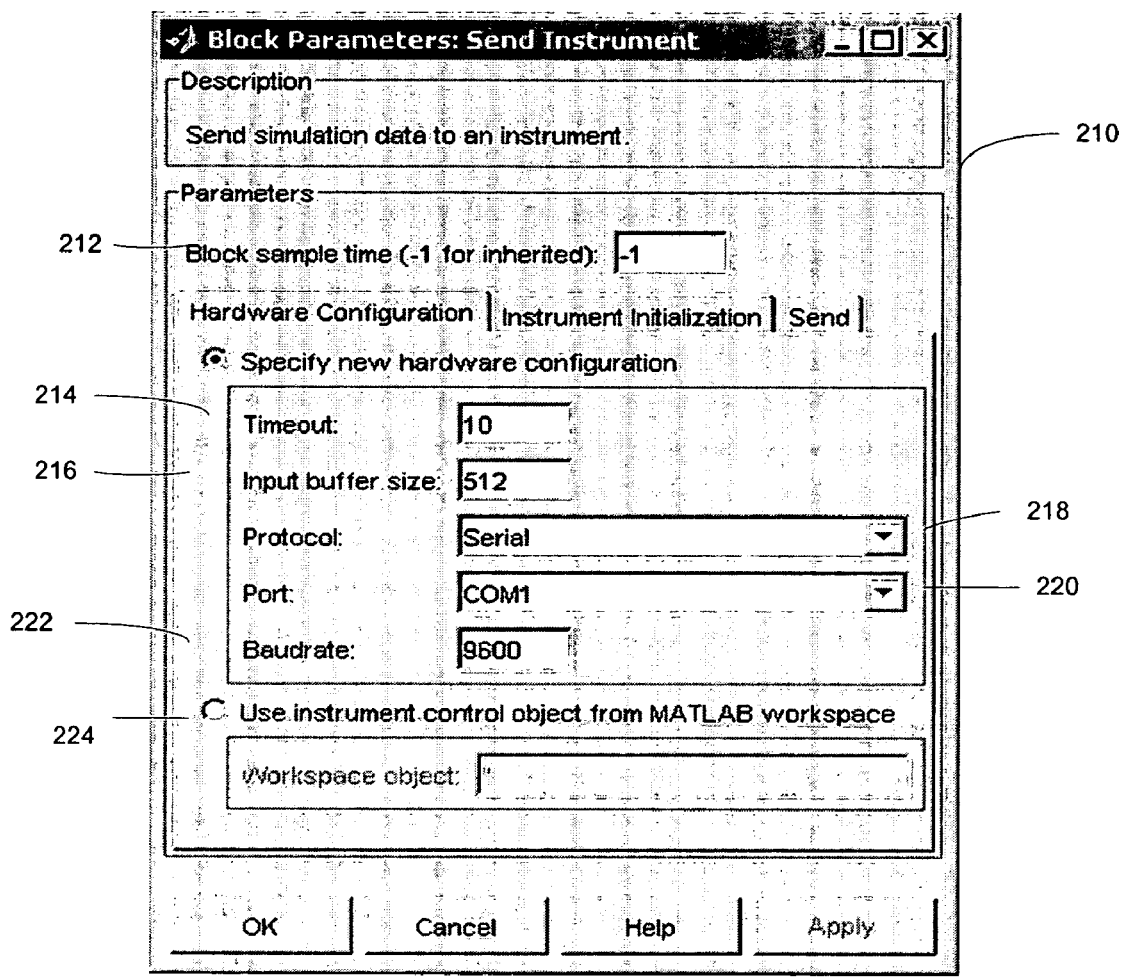
FIG. 6A depicts a user interface used by the illustrative embodiment of the present invention to enable a user to select hardware configuration parameters for a communication interface block used in a send command to a control instrument.

Similar to the data acquisition process, the illustrative embodiment of the present invention provides a user interface that allows a user to select parameters 14 in the communication interface block 12 for instrument control. FIG. 6A depicts a user interface 210 utilized by the illustrative embodiment of the present invention that allows a user to select block parameters for the communication interface block to be used in sending commands to a control instrument. The parameters include a block sample time 212, a timeout duration 214, an input buffer size 216, the type of communication protocol 218, the port to be utilized in communicating with the external device 220, and the baud rate at which to send communications 222. The user is also allowed the option as with querying the control instrument for data of using an already existing instrument object saved in a MATLAB workspace 224.

Figure 6B:
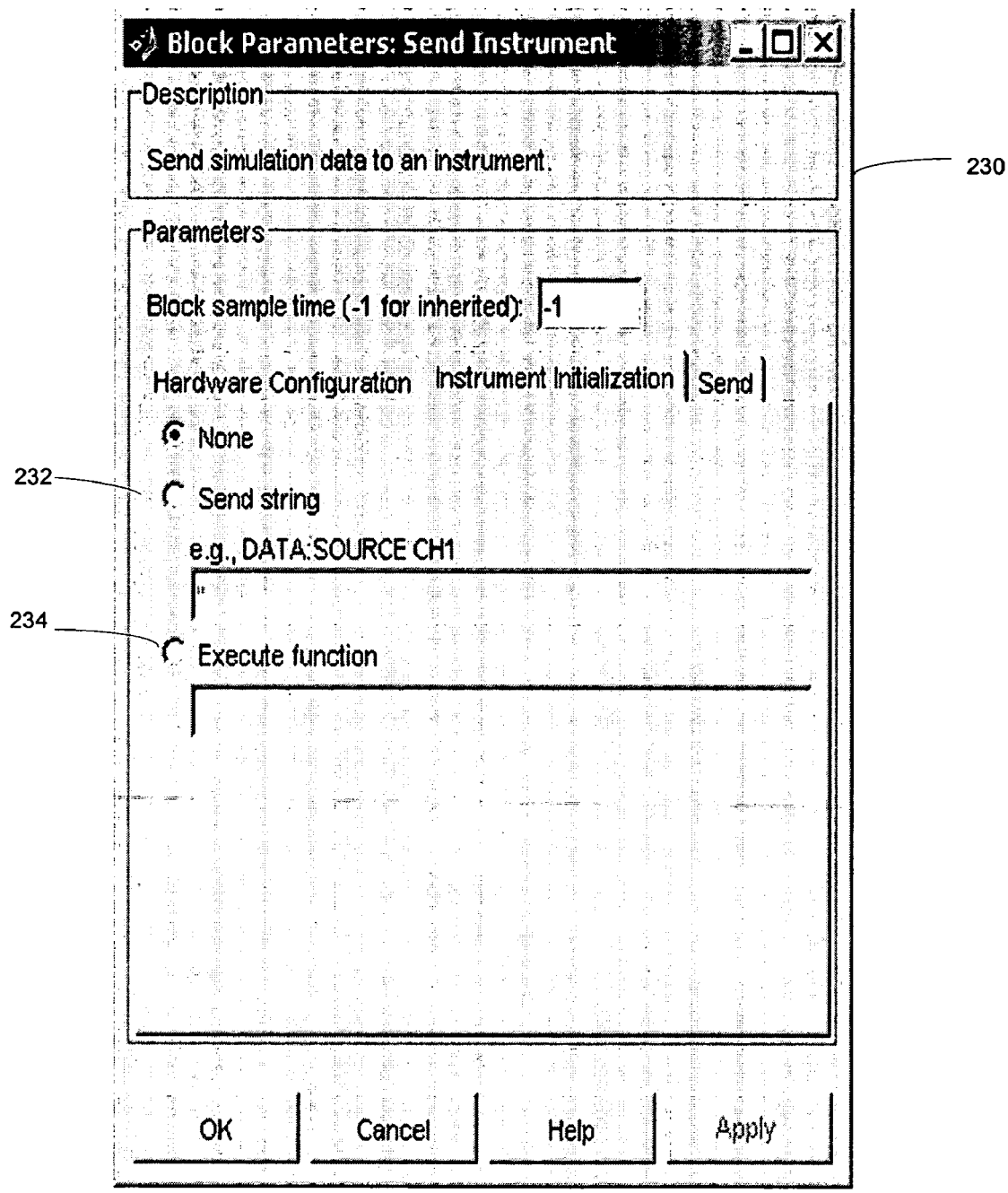
FIG. 6B depicts a user interface used by the illustrative embodiment of the present invention enabling a user to select instrument initialization parameters for a communication interface block used in a send command.

The user may also select initialization parameters for the instrument prior to sending a command. FIG. 6B depicts an additional view 230 by which a user may select parameters for the communication interface block prior to using the block to send commands to the control instrument. The view 230 includes the specification of a string command (a string where the group of characters equates to a command in a programming language) 232 or the specification of a MATLAB function 234 to be executed by the control instrument upon its receipt after being sent by the communication interface block executing based on its sample time.

Figure 6C:
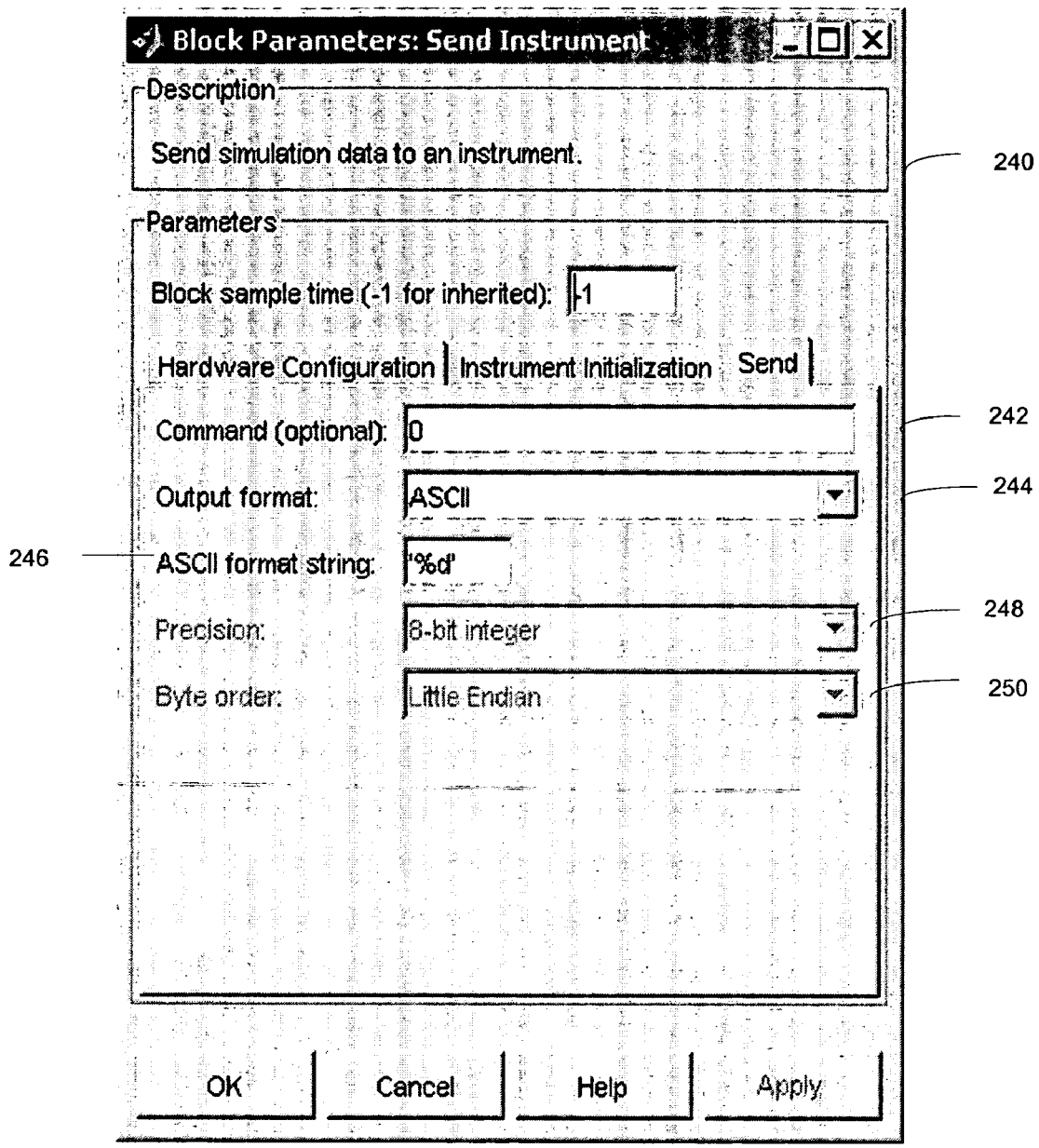
FIG. 6C depicts a user interface used by the illustrative embodiment of the present invention enabling a user to select send parameters to be used for a communication interface block to be used with a send command to a control instrument.

FIG. 6C depicts an additional view 240 enabling a user to select parameters for the communication interface block relating to a send command. The parameters include a send command 242, an output format 244 such as UINT8, UINT16, or ASCII, an ASCII format string 246, a numerical precision parameter 248 and a byte order 250.

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrative flowcharts are examples and not the exclusive sequence of steps possible within the scope of the present invention and data structures other than the ones mentioned herein may be used to hold data without departing from the scope of the present invention.

We claim:

1. In a block diagram modeling environment, a computer-implemented method comprising:
providing an executable block diagram of a system in said block diagram modeling environment, said executable block diagram including a system model;
providing an executable hardware independent communication interface block connected to said system model in said executable block diagram of said system in said block diagram modeling environment, said communication interface block:
being an executable graphical component in said executable block diagram provided in said block diagram modeling environment, and
representing an interface between said system and a control instrument;
receiving a selection of block parameters for said communication interface block from within said block diagram modeling environment;
creating programmatically, by the communication interface block, in response to receiving said selection, an instrument object using said selection of said block parameters, said instrument object calling a driver based on said selection of said block parameters, said driver being:

appropriate for communication with a hardware interface of said control instrument, and distinct from said communication interface block;

instantiating said instrument object during an initialization of said executable block diagram, said initialization involving processing said communication interface block, said instantiating occurring during said processing of said communication interface block; and communicating with said hardware interface of said control instrument using said instrument object, said communicating providing data to said executable block diagram of said system.

2. The method of claim 1, further comprising:

transmitting a query for data from said block diagram of said system to said control instrument using said instrument object.

3. The method of claim 2, further comprising:

receiving a response to said query for data at said block diagram from said control instrument using said instrument object.

4. The method of claim 3, further comprising:

using said data in a simulation of said block diagram.

5. The method of claim 1, further comprising:

transmitting a command to said control instrument.

6. The method of claim 5, further comprising:

receiving data from said control instrument following execution of said command by said control instrument.

7. The method of claim 1 wherein said block parameters include a protocol to be used to communicate with said control instrument.

8. The method of claim 7 wherein said protocol is one of Serial, General Purpose Interface Bus (GPIB), Virtual Machine Environment Extended for Instrumentation (VXI), Virtual Instrument Software Architecture (VISA) GPIB-VXI, TCP/IP, UDP, Universal Serial Bus (USB), IEEE1394, IEEE 1553, USB/VISA, TCP/VISA, FieldBus, and CAN-Bus.

9. The method of claim 1 wherein said block parameters include specifying a communication port.

10. The method of claim 1 wherein said block parameters include specifying a buffer size.

11. The method of claim 1 wherein said block parameters include specifying a timeout duration.

12. The method of claim 1 wherein said block parameters include an execution of a function.

13. The method of claim 1 wherein said block parameters include specifying a sample time for said communication interface block.

14. The method of claim 13 wherein said sample time is inherited.

15. The method of claim 1 wherein said block parameters include a query command.

16. The method of claim 1 wherein said block parameters specify a data format to be used for a response from said control instrument.

17. The method of claim 1 wherein said block parameters include an association of a workspace object from an interpreted computing environment with said communication interface block.

18. The method of claim 1 wherein said block parameters include specifying at least one of a numerical precision parameter and a byte order parameter for an instrument response.

19. The method of claim 1 wherein said block parameters include specifying a frame size to be used in communication between said system and said control instrument.

20. The method of claim 1 wherein said block parameters indicate a repetition of a query sent from said system to said control instrument.

21. The method of claim 1, further comprising:

sending simulation data from said block diagram to said control instrument.

22. A non-transitory computer-readable storage medium holding one or more computer-executable instructions, said instructions including one or more instructions for:

providing an executable block diagram of a system in a block diagram modeling environment, said executable block diagram including a system model;

providing an executable hardware independent communication interface block connected to said system model in said executable block diagram of said system in said block diagram modeling environment, said communication interface block:

being an executable graphical component in said executable block diagram provided in said block diagram modeling environment, and representing an interface between said system and a control instrument;

receiving a selection of block parameters for said communication interface block from within said block diagram modeling environment;

creating programmatically, by said communication interface block, in response to receiving said selection, an instrument object using said selection of said block parameters, said instrument object calling a driver based on said selection of said block parameters, said driver being:

appropriate for communication with a hardware interface of said control instrument, and distinct from said communication interface block;

instantiating said instrument object during an initialization of said executable block diagram, said initialization involving processing said communication interface block, said instantiating occurring during said processing of said communication interface block; and communicating with said hardware interface of said control instrument using said instrument object, said communicating providing data to said executable block diagram of said system.

23. The medium of claim 22, wherein said instructions further include one or more instructions for:

transmitting a query for data from said block diagram of said system to said control instrument using said instrument object.

24. The medium of claim 23, wherein said instructions further include one or more instructions for:

receiving a response to said query for data at said block diagram from said control instrument using said instrument object.

25. The medium of claim 23, wherein said instructions further include one or more instructions for:

using said data in a simulation of said block diagram.

26. The medium of claim 22, wherein said instructions further include one or more instructions for:

transmitting a command to said control instrument.

27. The medium of claim 26, wherein said instructions further include one or more instructions for:

receiving data from said control instrument following execution of said command by said control instrument.

28. The medium of claim 22 wherein said block parameters include a protocol to be used to communicate with said control instrument.

29. The medium of claim 28 wherein said protocol is one of Serial, General Purpose Interface Bus (GPIB), Virtual Machine Environment Extended for Instrumentation (VXI), Virtual Instrument Software Architecture (VISA) GPIB-VXI, TCP/IP, UDP, Universal Serial Bus (USB), IEEE1394, IEEE 1553, USB/VISA, TCP/VISA, FieldBus, and CAN-Bus.

30. The medium of claim 22 wherein said block parameters include specifying a communication port.

31. The medium of claim 22 wherein said block parameters include specifying a buffer size.

32. The medium of claim 22 wherein said block parameters include specifying a timeout duration.

33. The medium of claim 22 wherein said block parameters include an execution of a function.

34. The medium of claim 22 wherein said block parameters include specifying a sample time for said communication interface block.

35. The medium of claim 34 wherein said sample time is inherited.

36. The medium of claim 22 wherein said block parameters include a query command.

37. The medium of claim 22 wherein said block parameters specify a data format to be used for a response from said control instrument.

38. The medium of claim 22 wherein said block parameters include an association of a workspace object from an interpreted computing environment with said communication interface block.

39. The medium of claim 22 wherein said block parameters include specifying at least one of a numerical precision parameter and a byte order parameter for an instrument response.

40. The medium of claim 22 wherein said block parameters include specifying a frame size to be used in communication between said system and said control instrument.

41. The medium of claim 22 wherein said block parameters indicate a repetition of a query sent from said system to said control instrument.

42. The medium of claim 22, wherein said instructions further include one or more instructions for:
    sending simulation data from said block diagram to said control instrument.

43. In a block diagram modeling environment, a computer-implemented method comprising:
    providing an executable block diagram of a system in said block diagram modeling environment, said executable block diagram including a system model;
    providing an executable hardware independent communication interface block connected to said system model in said executable block diagram of said system in said block diagram modeling environment, said communication interface block:
        being an executable graphical component in said executable block diagram provided in said block diagram modeling environment, and
        representing an interface between said system and one of a data acquisition device and an image acquisition device;
    receiving a selection of block parameters for said communication interface block from within said block diagram modeling environment;
    creating programmatically, by the communication interface block, in response to receiving said selection, one of an acquisition device object and an image acquisition device object using said selection of block parameters, said one of said acquisition device object and said image acquisition device object calling a driver based on said selection of block parameters, said driver being:
        appropriate for communication with a hardware interface of said one of said data acquisition device and said image acquisition device, and
        being distinct from the communication interface block;
    instantiating one of said acquisition device object and said image acquisition device object during an initialization of said executable block diagram, said initialization of said executable block diagram including processing said communication interface block, said instantiating occurring during said processing of said communication interface block; and
    communicating with said hardware interface of one of said data acquisition device and said image acquisition device using one of said acquisition device object and said image acquisition device object, said communicating providing data to said executable block diagram of said system.

44. The method of claim 43 wherein said communication interface block is one of an analog input block, analog output block, digital input block, and digital output block.

45. The method of claim 43, further comprising:
    receiving data from one of said data acquisition device and said image acquisition device during a simulation of said block diagram; and
    using said data in said simulation.

46. The method of claim 45 wherein said data is received from said image acquisition device and wherein said data is image data.

47. The method of claim 45 wherein said block parameters include a user-selectable parameter indicating an action to take following an ending of said receiving of data during said simulation.

48. The method of claim 47 wherein said action is a repetitive sending of the last received value to said simulation.

49. The method of claim 47 wherein said action is a retransmission of said received data to said simulation, said transmission looping around a set of said received data so as to retransmit said data in order from a first received data to a last received data.

50. The method of claim 47 wherein said action sends a request for further data to said one of said data acquisition device and said image acquisition device.

51. The method of claim 45 wherein said received data is image data and wherein said block parameters indicate a use of more than one channel to transmit said data.

52. The method of claim 45 wherein said data is analog data.

53. The method of claim 52 wherein said analog data is video or still-image data.

54. The method of claim 45 wherein said data is digital data.

55. The method of claim 54 wherein said digital data is video or still-image data.

56. The method of claim 43, further comprising:
    performing a simulation using said block diagram, said simulation generating data; and
    transmitting said generated data from said block diagram to said one of said data acquisition device and said image acquisition device, said transmitting using said acquisition device object.

57. The method of claim 56 wherein said data is analog data.

58. The method of claim 57 wherein said analog data is transmitted to said image acquisition device and wherein said analog data is video or still-image data.

59. The method of claim 56 wherein said data is digital data.

60. The method of claim 59 wherein said digital data is transmitted to said image acquisition device and wherein said digital data is video or still-image data.

61. The method of claim 43 wherein said acquisition device object uses a lookup table to determine a communication protocol appropriate for said one of said data acquisition device and said image acquisition device.

62. The method of claim 61 wherein said protocol is one of PCI, ISA, Universal Serial Bus (USB), IEEE1394, Firewire, CameraLink, PCI-X, Virtual Machine Environment Extended for Instrumentation (VXI), and vendor-specific Software Development Kits (SDKs).

63. The method of claim 43 wherein said block parameters include an association of a workspace object from an interpreted computing environment with said communication interface block.

64. The method of claim 43 wherein said block parameters include one of an adaptor name, an adaptor type, a manufacturer hardware ID, a line select parameter, a line ID, a line name, a line description, a line port number, a sample rate, an input type, a channel selection, a channel ID, a channel name, a channel description, a channel input range, a channel output range, a frame size, a buffer length, and an output action.

65. A non-transitory computer-readable storage medium one or more computer-executable instructions, said instructions including one or more instructions for:
    providing an executable block diagram of a system in a block diagram modeling environment, said executable block diagram including a system model;
    providing an executable hardware independent communication interface block connected to said system model in said executable block diagram of said system in said block diagram modeling environment, said communication interface block:
        being an executable graphical component in said executable block diagram provided in said block diagram modeling environment, and
        representing an interface between said system and one of a data acquisition device and an image acquisition device,
    receiving a selection of block parameters for said communication interface block from within said block diagram modeling environment;
    creating programmatically, by the communication interface block, in response to receiving said selection, one of an acquisition device object and an image acquisition device object using said selection of block parameters, said one of said acquisition device object and said image acquisition device object calling a driver based on said selection of block parameters, said driver being:
        appropriate for communication with a hardware interface of said one of said data acquisition device and said image acquisition device, and
        distinct from the communication interface block;
    instantiating one of said acquisition device object and said image acquisition device object during an initialization of said executable block diagram, said initialization of said executable block diagram including processing said communication interface block, said instantiating occurring during said processing of said communication interface block; and
    communicating with said hardware interface of one of said data acquisition device and said image acquisition device using one of said acquisition device object and said image acquisition device object, said communicating providing data to said executable block diagram of said system.

66. The medium of claim 65 wherein said communication interface block is one of an analog input block, analog output block, digital input block, and digital output block.

67. The medium of claim 65, wherein said instructions further include one or more instructions for:
    receiving data from one of said data acquisition device and said image acquisition device during a simulation of said block diagram; and
    using said data in said simulation.

68. The method of claim 66 wherein said data is received from said image acquisition device and wherein said data is one of video input and still-image input.

69. The medium of claim 66 wherein said block parameters include a user-selectable parameter indicating an action to take following an ending of said receiving of data during said simulation.

70. The medium of claim 69 wherein said action is a repetitive sending of the last received value to said simulation.

71. The medium of claim 69 wherein said action is a retransmission of said received data to said simulation, said transmission looping around a set of said received data so as to retransmit said data in order from a first received data to a last received data.

72. The medium of claim 69 wherein said action sends a request for further data to said one of said data acquisition device and said image acquisition device.

73. The medium of claim 67 wherein said received data is image data and wherein said block parameters indicate the use of more than one channel to transmit said data.

74. The medium of claim 67 wherein said data is analog data.

75. The medium of claim 74 wherein said analog data is transmitted to said image acquisition device and wherein said analog data is video or still-image data.

76. The medium of claim 67 wherein said data is digital data.

77. The medium of claim 76 wherein said digital data is transmitted to said image acquisition device and wherein said digital data is video or still-image data.

78. The medium of claim 65, wherein said instructions further include one or more instructions for:
    performing a simulation using said block diagram, said simulation generating data; and
    transmitting said generated data from said block diagram to said one of said data acquisition device and said image acquisition device, said transmitting using said acquisition device object.

79. The medium of claim 78 wherein said data is analog data.

80. The medium of claim 79 wherein said analog data is video or still-image data.

81. The medium of claim 78 wherein said data is digital data.

82. The medium of claim 81 wherein said digital data is video or still-image data.

83. The medium of claim 65 wherein said acquisition device object uses a lookup table to determine a communication protocol appropriate for said one of said data acquisition device and said image acquisition device.

84. The medium of claim 83 wherein said protocol is one of PCI, ISA, Universal Serial Bus (USB), IEEE1394, Firewire, CameraLink, PCI-X, Virtual Machine Environment Extended for Instrumentation (VXI), and vendor-specific Software Development Kits (SDKs).

85. The medium of claim 65 wherein said block parameters include an association of a workspace object from an interpreted computing environment with said communication interface block.

86. The medium of claim 65 wherein said block parameters include one of an adaptor name, an adaptor type, a manufacturer hardware ID, a line select parameter, a line ID, a line name, a line description, a line port number, a sample rate, an input type, a channel selection, a channel ID, a channel name, a channel description, a channel input range, a channel output range, a frame size, a buffer length, and an output action.

87. An apparatus comprising:
a memory; and
a processor configured to:
provide a block diagram modeling environment holding at least one executable block diagram of a system being modeled, said block diagram including a system model and at least one executable hardware independent communication interface block connected to said system model in said block diagram of said system in said block diagram modeling environment, said communication interface block:
being an executable graphical component in said block diagram provided in said block diagram modeling environment,
representing a hardware interface between said processor and an external device,
including block parameters selectable from within said block diagram modeling environment,
receive a selection of said block parameters for said communication interface block, create, in response to receiving said selection, an object based on said selection of said block parameters using the communication interface block, said object configured to call a driver based on said selection of said block parameters, said driver being:
appropriate for communication with said external device via said hardware interface,
distinct from the communication interface block, and
store said object in the memory.

88. The apparatus of claim 87 wherein simulation data generated from a simulation of said block diagram is sent to said external device using said created object.

89. The apparatus of claim 87 wherein a command is sent from said block diagram to said external device.

90. The apparatus of claim 87 wherein a query for data is sent from said block diagram to said external device.

91. The apparatus of claim 87 wherein said external device is one of a control instrument, image acquisition device, and data acquisition device.

92. The apparatus of claim 87 wherein said external device transmits data to said block diagram environment for use in an ongoing simulation of said block diagram, said transmitted data received using said created object.

93. The apparatus of claim 87 wherein said external device is connected to at least one external system.

* * * * *